US00RE37728E

(19) United States
(12) Reissued Patent
Kamm

(10) Patent Number: US RE37,728 E
(45) Date of Reissued Patent: Jun. 4, 2002

(54) VARIABLE SPEED MECHANISM AND METHOD FOR CONTROLLING THE SPEED OF AN ASSOCIATED VEHICLE

(75) Inventor: Michael Kamm, Lyndhurst, OH (US)

(73) Assignee: MTD Products Inc, Cleveland, OH (US)

(21) Appl. No.: 09/578,521

(22) Filed: May 24, 2000

Related U.S. Patent Documents

Reissue of:
(64) Patent No.: 5,803,847
Issued: Sep. 8, 1998
Appl. No.: 08/708,373
Filed: Sep. 5, 1996

(51) Int. Cl.[7] ..... F16H 9/12; F16H 55/56
(52) U.S. Cl. ..... 474/37; 474/46; 474/69
(58) Field of Search ..... 474/8, 25, 37; 56/11.1, 11.6, 11.8; 180/19.3

(56) References Cited

U.S. PATENT DOCUMENTS

| | | | | |
|---|---|---|---|---|
| 2,205,976 | A | 6/1940 | Heyer | 74/230.17 |
| 2,740,246 | A | 4/1956 | Smith et al. | 56/25.4 |
| 3,190,136 | A | 6/1965 | Steuer | 74/230.17 |
| 4,117,652 | A | 10/1978 | Jones | 56/11.8 |
| 4,119,326 | A | 10/1978 | Porter | 280/236 |
| 5,236,395 | A | 8/1993 | Lucich et al. | 474/69 |

FOREIGN PATENT DOCUMENTS

| | | |
|---|---|---|
| FR | 2210091 | 6/1974 |
| GB | 1379553 | 1/1975 |
| WO | 8707932 | 12/1987 |
| WO | 9311375 | 6/1993 |

*Primary Examiner*—Thomas R. Hannon
(74) *Attorney, Agent, or Firm*—Roger D. Emerson; Daniel A. Thomson; Emerson & Skeriotis

(57) ABSTRACT

A variable speed mechanism for propelling an associated lawn mowing apparatus has a variable pitch pulley assembly, a belt which connects the variable pitch pulley assembly to a transmission, a control arm assembly for controlling the variable pitch pulley assembly, and a speed selector for selectively adjusting the control arm assembly. The speed selector is positioned corresponding to the desired lawn mowing apparatus ground speed. This creates tension in a cable which moves a control arm. When the control arm is moved, it rotates about a pivot shaft adjusting the position of a bearing cup which, in turn, adjusts the position of the moveable pulley half within variable pitch pulley assembly. Once the pulley assembly has been positioned, the effective belt diameter is set. If the effective belt diameter is increased, the speed supplied to the transmission is increased assuming a fixed pulley size on the transmission input. If the effective belt diameter is decreased, the speed supplied to the transmission is decreased.

13 Claims, 6 Drawing Sheets

VARIABLE SPEED MECHANISM AND METHOD FOR CONTROLLING THE SPEED OF AN ASSOCIATED VEHICLE

Matter enclosed in heavy brackets [ ] appears in the original patent but forms no part of this reissue specification; matter printed in italics indicates the additions made by reissue.

BACKGROUND OF THE INVENTION

1. Field of Invention

This invention pertains to the art of methods and apparatuses for use in controlling the ground speed of a lawn mowing apparatuses, and more specifically to methods and apparatuses for use in controlling the ground speed of a walk-behind mower.

2. Description of the Related Art

It is well known to provide lawn mowing apparatuses, specifically lawn and garden lawn mowing apparatuses such as walk-behind lawn mowers, with apparatuses and methods for controlling their ground speed. One known method uses a spring loaded variable pitch pulley assembly attached to a rotating shaft. The variable pitch pulley assembly typically has two pulley halves forming a "V" shape for a belt connecting the pulley assembly to some type of transmission which is operatively connected to a drive axle. The belt tension is adjusted by any of various means known in the art. When the belt tension is increased, the two pulley halves are forced apart by the belt, allowing the belt to move inwardly toward the shaft. This movement decreases the effective belt diameter of the pulley assembly, supplying a slower speed to the transmission. When the belt tension is decreased, the spring causes the two pulley halves to move closer together, forcing the belt to move outwardly from the shaft. This movement increases the effective belt diameter of the pulley assembly, supplying a faster speed to the transmission.

*Another known type is described in U.S. Pat. No. 4,117, 652 to Jones et al. Jones et al. discloses a belt-driven transmission that is mounted on a deck of a mower between a pair of wheels. The transmission is driven through a pulley on the engine drive shaft and a pulley on the transmission connected by a belt. The pulley on the transmission includes an upper stationary half affixed to a splined end of a transmission input shaft and a lower half mounted for axial movement on the input shaft. A speed change lever is rotated about the input shaft and includes numerous sloping cam surfaces.*

The present invention provides methods and apparatuses for controlling the ground speed of a lawn mowing apparatus using a non-spring loaded variable pitch pulley assembly and a control arm assembly. It is not necessary to adjust the belt tension because the control arm assembly is in contact with one of the pulley halves and it is used to adjust the distance between the two pulley halves. *The variable pitch pulley is positioned between the motor and the cutting blade on the primary drive shaft. Thus, unlike Jones et al., the gear (pulley) ratios permit a maximum speed to be provided to the transmission. Also unlike Jones et al., a control arm adjusts the variable pitch pulley assembly using vertical adjustment along the length of the drive shaft. This is considered a significant improvement over the sloping cam surfaces provided by Jones et al.*

SUMMARY OF THE INVENTION

In accordance with one aspect of the invention there is provided a variable speed mechanism for propelling an associated lawn mowing apparatus which has a body, a transmission which is operatively connected to a drive axle, a shaft, and means for rotating the shaft. The variable speed mechanism has a variable pitch pulley assembly with two pulley halves which is operatively connected to the shaft, a belt connecting the variable pitch pulley assembly to the transmission, a control arm assembly for controlling the distance between the two pulley halves, and means for selectively adjusting the control arm assembly. When the control arm assembly is adjusted, the distance between the two pulley halves is also adjusted. When the pulley halves are brought closer together the belt is force outwardly, away from the shaft, increasing the effective belt diameter of the pulley assembly. Thus, the belt supplies a faster speed to the transmission. When the pulley halves are brought farther apart, the belt under normal operating tension, is forced inwardly, toward the shaft, decreasing the effective belt diameter of the pulley. In this case, the belt supplies a slower speed to the transmission.

In accordance with another aspect of the present invention, there is provided a control arm assembly for use with a variable speed mechanism. The control arm assembly includes a control arm, a pivot shaft, a pivot bracket and a torsion spring. When the control arm is moved, it pivots around the pivot shaft and adjusts the distance between two pulley halves of a variable pitch pulley assembly.

In accordance with another aspect of the present invention, there provided a method for selectively controlling the speed of a lawn mowing apparatus. A speed selector positioned corresponding to the desired lawn mowing apparatus speed. Then tension is applied to a cable which moves the end of a control arm. The control arm adjusts the distance between two pulley halves. As the distance between the two pulley halves changes, so does the effective belt diameter. Once the effective belt diameter has been changed, the speed supplied by the belt to a transmission is correspondingly changed.

The benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
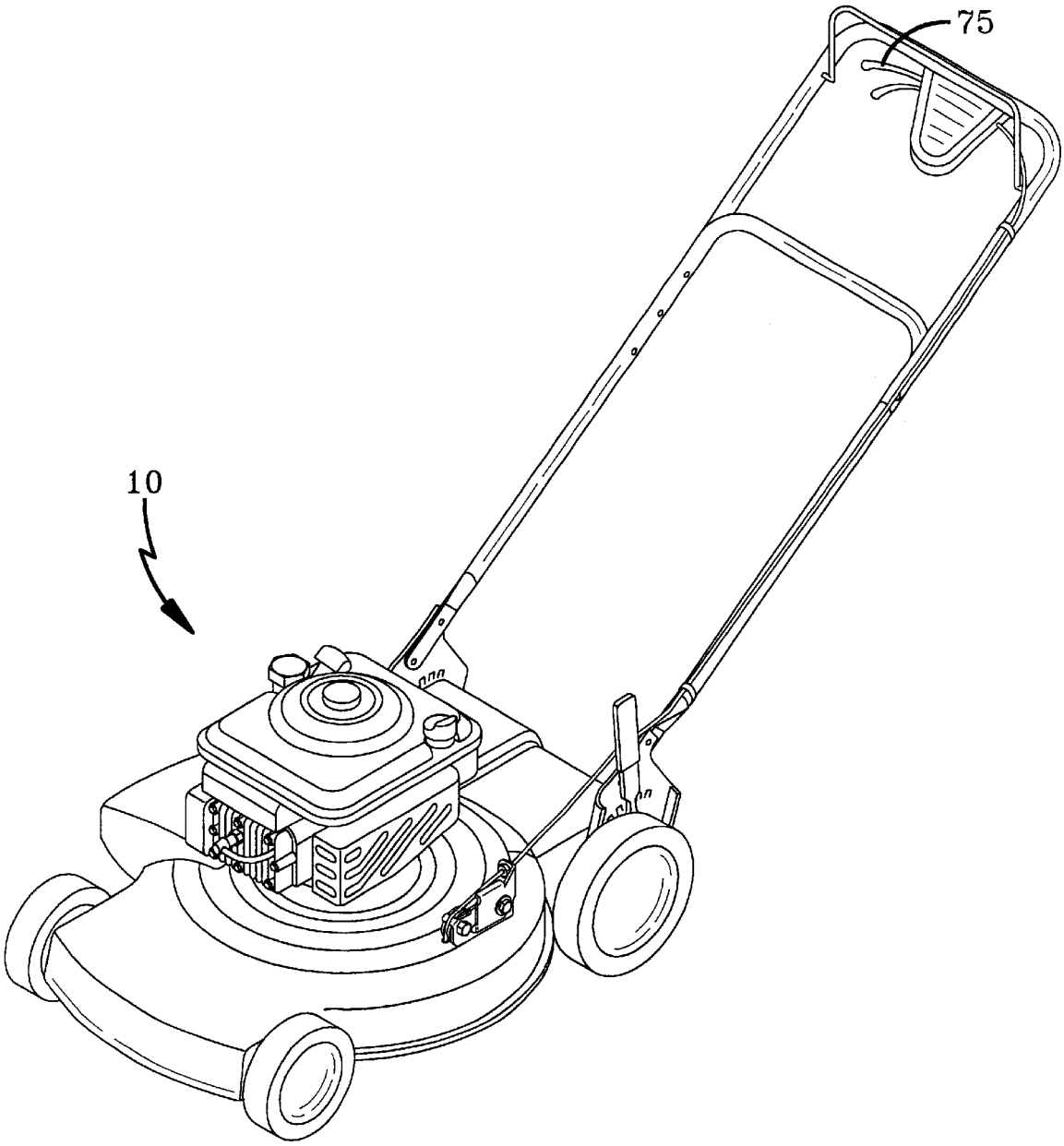
FIG. 1 shows a typical walk-behind mower using the variable speed mechanism of this invention.

Referring now to the drawings wherein the showings are for purposes of illustrating a preferred embodiment of the invention only and not for purposes of limiting the same, FIG. 1 shows a lawn mower 10 which is equipped with the present invention. This embodiment is a typical walk-behind lawn mower but the invention is applicable to riding mowers, off the road lawn mowing apparatuses, and other applications as well.

Figure 2:
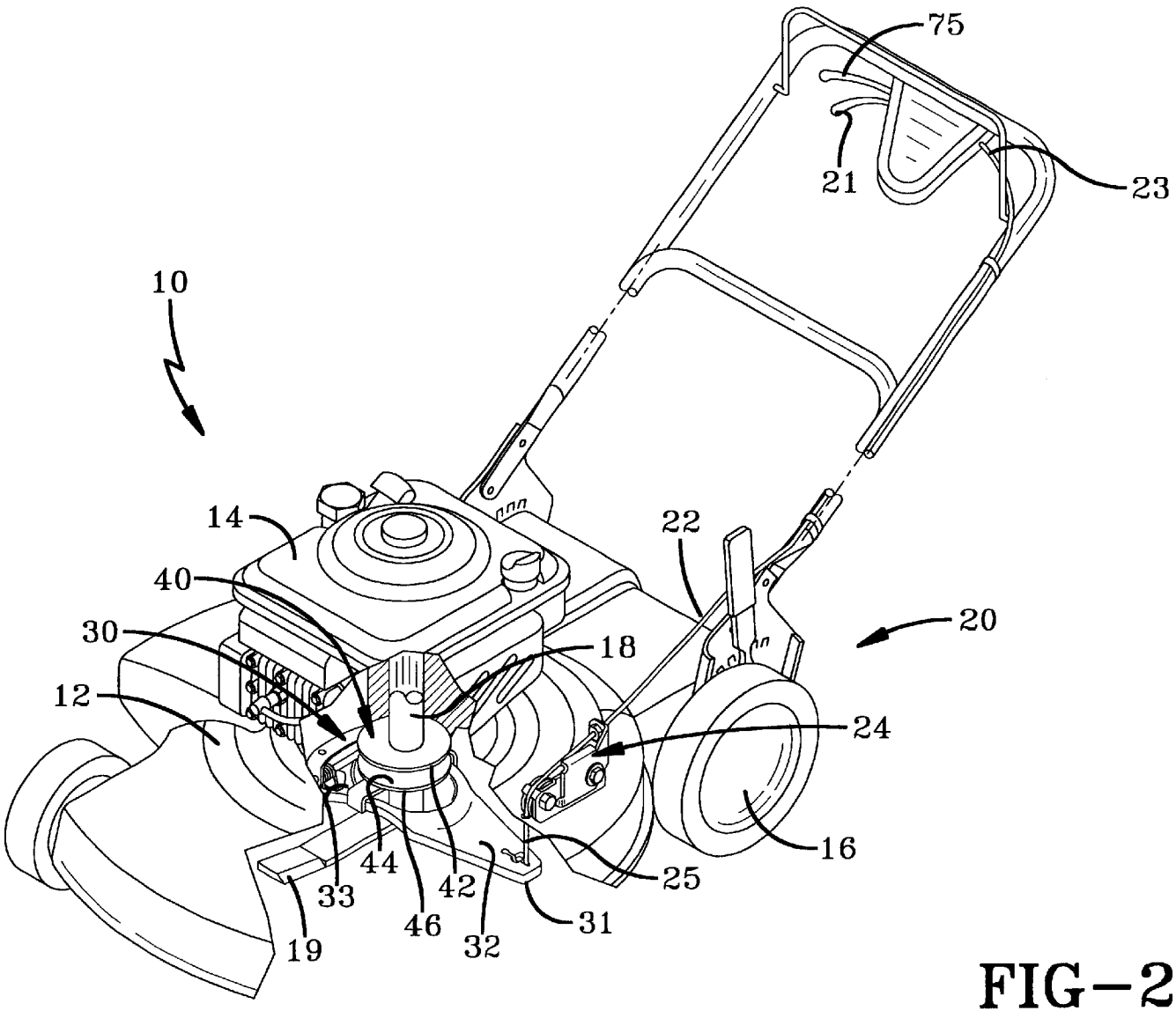
FIG. 2 is a sectional view of a typical walk-behind mower illustrating the variable speed mechanism of this invention.

FIG. 2 shows a cut-a-way of the lawn mower 10 which has a body 12, a motor 14 or other means for turning a shaft 18, and a cutting blade 19. The shaft 18 may be rotated at substantially one speed. The lawn mower 10 also has a transmission (not shown) for transmitting power to at least one of the wheels 16 and thereby propel the lawn mower 10. The sectional view shows the variable speed mechanism 20 of this invention. The variable speed mechanism 20 has a speed selector 21 and a cable 22 having first and second ends 23, 25 which runs from the speed selector 21, through a cable guide bracket 24 inside the body 12 to a control arm assembly 30. As seen in FIG. 2, the first end 23 of the cable 22 is operatively connected to the speed selector 21 and the second end 25 of the cable 22 is operatively connected to the control arm assembly 30. The control arm assembly 30 has a control arm 32 which has a first end 31 attached to the second end 25 of the cable 22 and a second end 33 which is attached to the body 12. The variable speed mechanism 20 also has a variable pitch pulley assembly 40. The variable pitch pulley assembly 40 has a first pulley half 42 and a second pulley half 44. The variable pitch pulley assembly 40 also has a bearing cup 46 which contacts control arm 32. The second pulley half 44 rests on bearing cup 46. A belt (not shown) fits between first pulley half 42 and second pulley half 44 and connects to a transmission (not shown). Finally, a idler is actuated by clutch lever 75 to engage or disengage a belt to propel or stop the mower.

Figure 3:
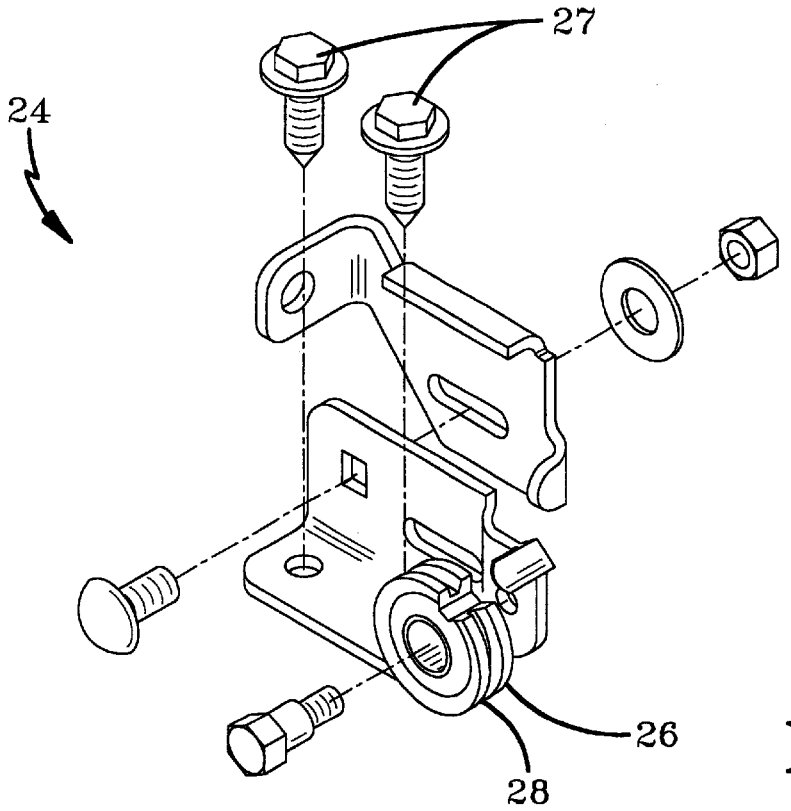
FIG. 3 is an assembly drawing of the cable guide bracket.
Figure 4:
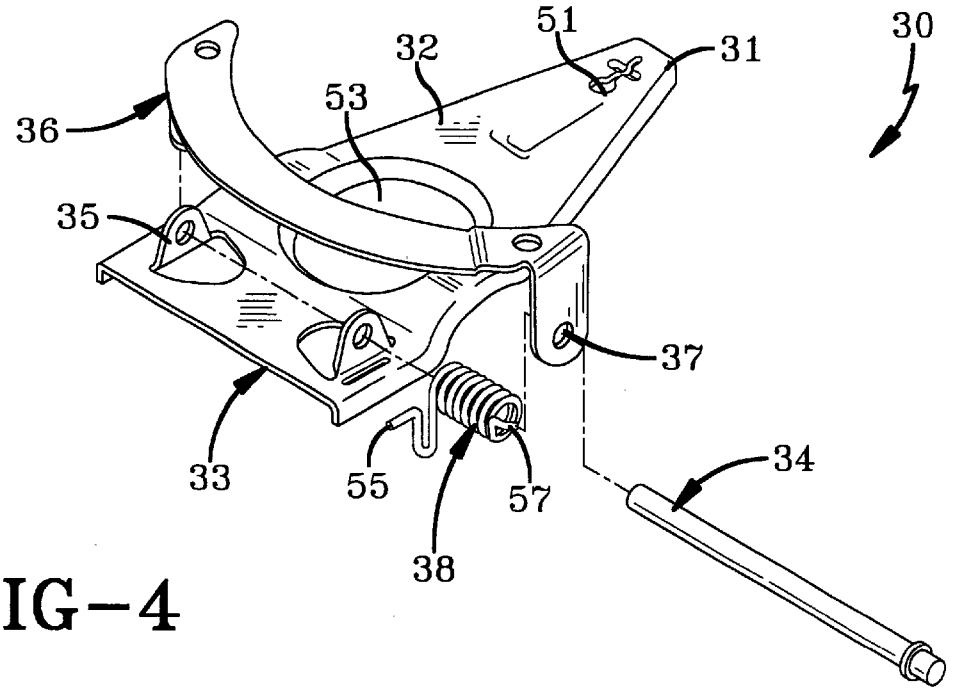
FIG. 4 is an assembly drawing of the control arm assembly.

As can be seen in FIG. 3, the cable guide bracket 24 has a free rolling roller 26 which has a cable channel 28 around its circumference to help guide the cable (not shown). The cable guide bracket 24 is fixedly attached to the body (not shown) with screws 27 but any other acceptable connecting means could be used. As seen in FIG. 2, the cable guide bracket 24 is positioned substantially above the control arm assembly 30.

Figure 5:
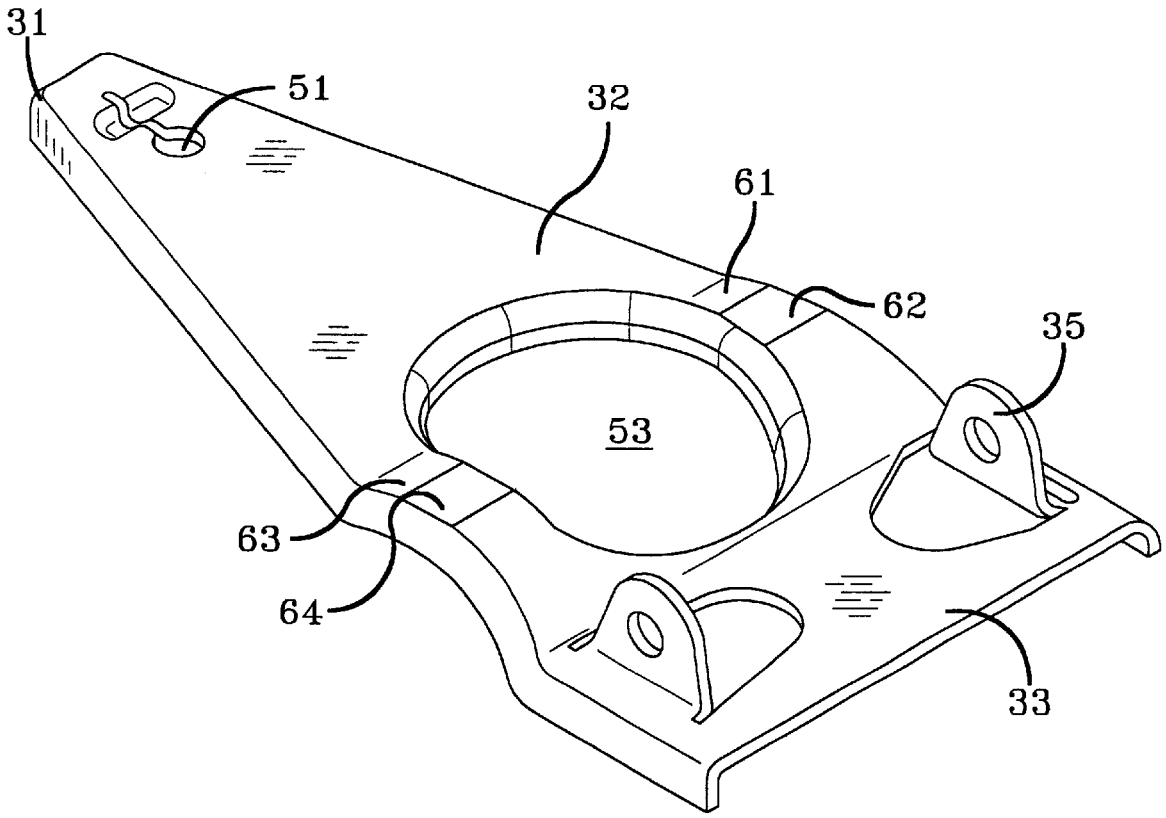
FIG. 5 shows the control arm.

With reference to FIGS. 2 and 4–6, the control arm assembly 30 has a control arm 32, a pivot shaft 34, a pivot bracket 36, and torsion spring 38. The control arm 32 has a first end 31 which has a hole 51 for holding the cable 22, an opening 53 into which the shaft and the bearing cup 46 fits, and a second end 33 which attaches to the body 12. The second end 33 of the control arm 32 has connecting members 35 which hold the pivot shaft 34. The pivot shaft 34 also fits into openings 37 in the pivot bracket 36 which connects the control arm 32 to the body (not shown). Torsion spring 38, having a first end 55 and a second end 57, fits around pivot shaft 34. The first end 55 of the torsion spring 38 fits against the second end 33 of the control arm 32. The second end 57 of the torsion spring 38 fits against the pivot bracket 36. With this arrangement, the torsion spring 38 biases the control arm 32 such that the first end 31 of the control arm 32 puts tension on the cable 22. With reference now to FIG. 5, the control arm 32 also has first 61 and second 63 sides which are in contact with a bearing cup (not shown here but discussed below). The first and second sides, 61 and 63, have contoured surfaces, 62 and 64, which permit even wear as the bearing cup moves across first and second sides 61 and 63.

Figure 6:
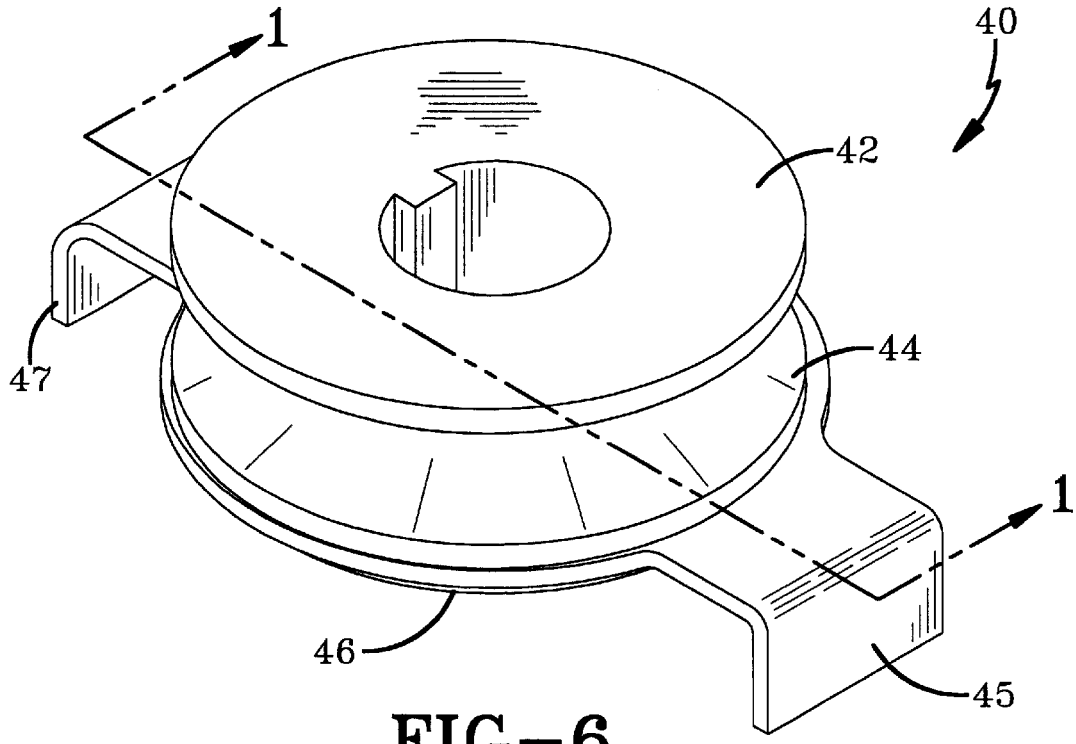
FIG. 6 is an assembly drawing of the variable pitch pulley assembly.
Figure 7:
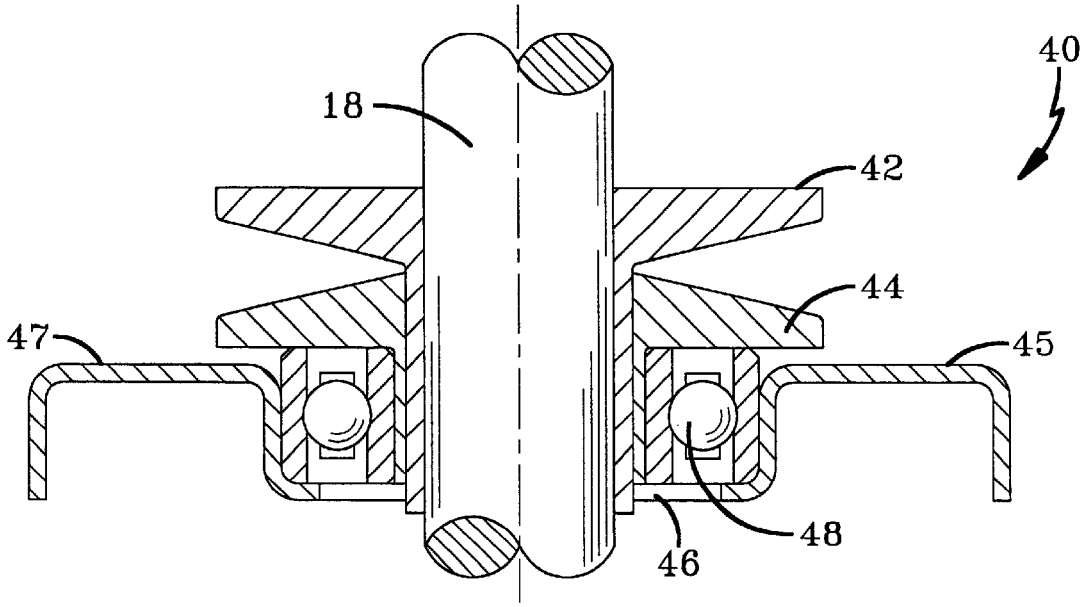
FIG. 7 is a cross-sectional view taken along the line 1—1 of FIG. 6 shown with a shaft added.

FIGS. 5–7 show the variable pitch pulley assembly 40 which has first 42 and second 44 pulley halves. As can be seen, the variable pitch pulley assembly 40 is operatively associated with the shaft 18. The second pulley half 44 can be moved along the length of shaft 18. The variable pitch pulley assembly 40 also has a bearing cup 46 which holds bearing 48. The bearing cup 46 has a first hook 45 and a second hook 47 for hooking the bearing cup 46 to the control arm 32. The first and second hooks 45, 47 fit on the contoured surfaces 62, 64 shown in FIG. 5, of the first and second sides 61, 63 respectively of the [control arm 30] control arm 32.

Figure 8:
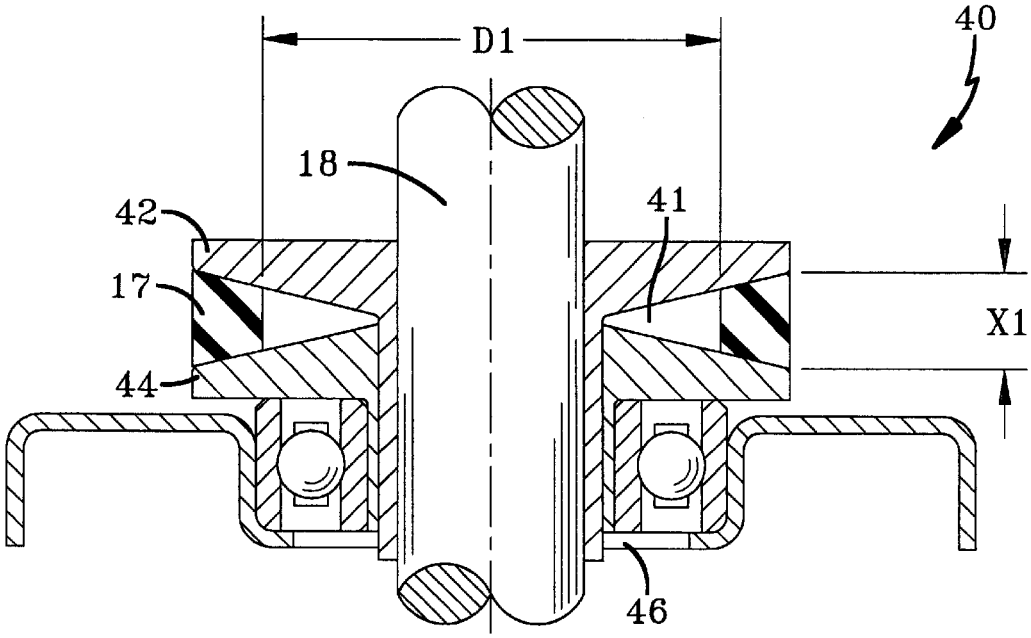
FIG. 8 is a cross-sectional view taken along the line 1—1 of FIG. 6 with a shaft added showing the effective belt diameter when the pulley halves are relatively close together; and, FIG. 9 is a cross-sectional view taken along the line 1—1 of FIG. 6 with a shaft added showing the effective belt diameter when the pulley halves are relatively far apart.
Figure 9:
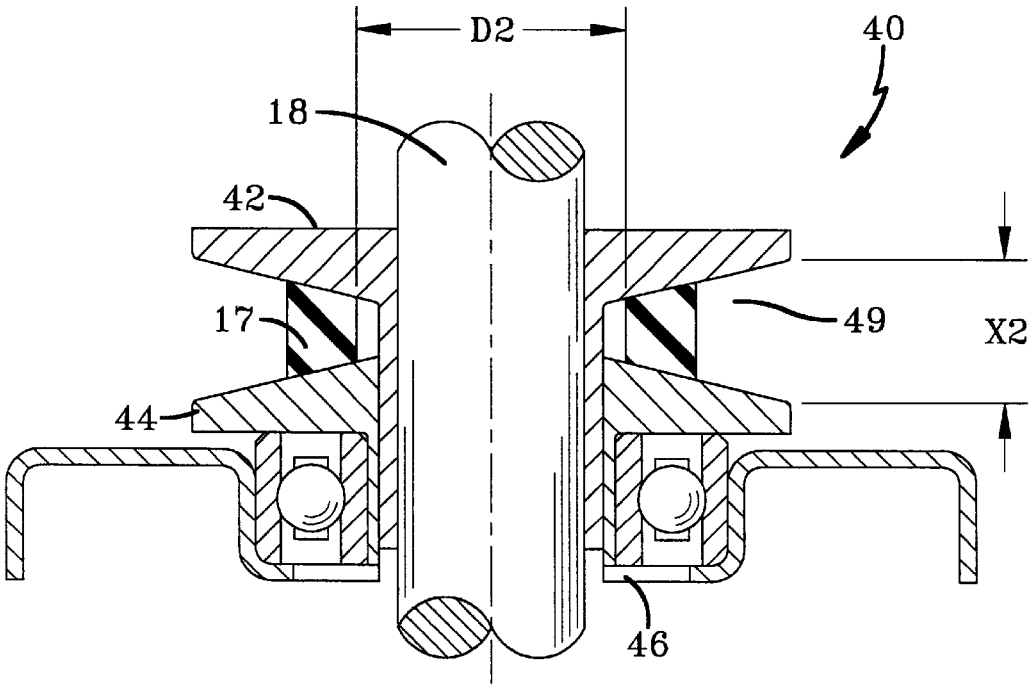

With reference now to FIGS. 8–9, movement of the bearing cup 46 along the shaft 18 also moves the second pulley half 44 and thus the effective diameter of the belt 17 is changed. FIG. 8 shows the variable pitch pulley assembly 40 where the distance between the first pulley half 42 and the second pulley half 44 is X1. The belt 17, which fits within the "V" shape 41, is thus positioned at an effective diameter D1. FIG. 9 shows the variable pitch pulley assembly 40 where now the distance between the first pulley half 42 and the second pulley half 44 is X2. Note that distance X2 is greater than the distance X1 and that "V" shape 49 is larger than "V" shape 41. The effective diameter D2 is, correspondingly, smaller than effective diameter D1. The larger the effective diameter of the variable pitch pulley assembly 40, the greater the speed which the belt 17 supplies to the transmission (not shown). Thus, the arrangement shown in FIG. 8 would provide greater speed than the arrangement shown in FIG. 9.

In the operation of the variable speed mechanism, with reference to FIG. 2, the speed selector 21 is positioned corresponding to the desired lawn mowing apparatus ground speed. Positioning the speed selector 21 creates tension in the cable 22 which correspondingly moves the first end 31 of the control arm 32. When the control arm 32 is moved, it rotates about the pivot shaft (shown in FIG. 4) adjusting the position of the bearing cup 46 which, in turn, adjusts the position of the second pulley half 44 along the shaft 18. Once the second pulley half 44 has been positioned, the effective belt diameter is set. If the effective belt diameter is increased, the speed supplied to the transmission is increased. If the effective belt diameter is decreased, the speed supplied to the transmission is decreased.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A lawn mowing apparatus comprising:

a body;

a drive axle;

a transmission operatively connected to said drive axle;

a shaft;

*a cutting blade operatively connected to said shaft;* rotating means for rotating said shaft; and, a variable speed mechanism for propelling said lawn mowing apparatus, said variable speed mechanism including:

A) a variable pitch pulley assembly[, said variable pitch pulley assembly operatively connected to] *having first and second pulley halves being positioned*

*between said rotating means and said cutting blade, said first and second pulley halves receiving* said shaft, *said second pulley half being selectively moveable along the length of said shaft*;

B) pulley connecting means for operatively connecting said variable pitch pulley assembly to said transmission, said pulley connecting means providing propulsion for said drive axle;

C) a control arm assembly for controlling *the position of* said [variable pitch pulley assembly, said control arm assembly operatively connected to said variable pitch pulley assembly, said control arm assembly also attached to said body] *second pulley half, said control arm assembly having a control arm positioned between said second pulley half and said cutting blade, said control arm having first and second ends and an opening that rotatably receives said shaft, said second end of said control arm being pivotably connected to said body*; and, D) selective adjusting means for selectively adjusting said control arm assembly, *said first end of said control arm being operatively connected to said selective adjusting means,* said selective adjusting means being positioned corresponding to the desired ground speed of said lawn mowing apparatus.

2. The lawn mowing apparatus of claim 1 wherein said variable pitch pulley assembly *further* comprises:

[a first pulley half;]

[a second pulley half, said second pulley half being selectively movable along the length of said shaft, said pulley connecting means fitting between said first and second pulley halves;]

a bearing, said bearing rotatably receiving said shaft, said bearing operatively associated with said second pulley half; and, a bearing cup for holding said bearing, said bearing cup contacting said control arm assembly.

3. The lawn mowing apparatus of claim 2 wherein said bearing cup has first and second hooks for hooking said bearing cup to said control arm assembly.

4. The lawn mowing apparatus of claim 1 wherein said rotating means rotates said shaft at substantially one speed.

[5. The lawn mowing apparatus of claim 1 wherein said control arm assembly comprises:

a control arm having first and second ends and an opening, said second end of said control arm being pivotably connected to the body, said first end of said control arm being operatively connected to said selective adjusting means, said shaft rotatably received within said opening in said control arm.]

6. The lawn mowing apparatus of claim [5] *1* wherein said control arm assembly further comprises:

a pivot shaft, said pivot shaft being operatively connected to said [first] *second* end of said control arm, said control arm pivoting about said pivot shaft; and, a pivot bracket, said pivot bracket being fixedly connected to said body, said pivot bracket supporting said pivot shaft.

7. The lawn mowing apparatus of claim [5] *1* wherein said control arm has a first side for contacting said variable pitch pulley assembly, said first side of said control arm having a contoured surface for even wear of said variable pitch pulley assembly.

8. The lawn mowing apparatus of claim 7 wherein said control arm has a second side for contacting said variable pitch pulley assembly, said second side having a contoured surface for even wear of said variable pitch pulley assembly.

9. The lawn mowing apparatus of claim 1 wherein said selective adjusting means comprises:

a speed selector, said speed selector for selectively adjusting said control arm assembly;

a cable having first and second ends, said first end of said cable being operatively connected to said speed selector, said second end of said cable being operatively connected to said control arm assembly; and, a cable guide bracket for guiding said cable, said cable guide bracket being fixedly connected to said body, said cable guide bracket having a free rolling roller, said free rolling roller having a cable channel around the circumference, said cable received within said cable channel.

10. The lawn mowing apparatus of claim 9 wherein said cable guide bracket is positioned substantially above said control arm assembly.

11. A lawn mowing apparatus comprising:

a body;

a drive axle;

a transmission operatively connected to said drive axle;

a shaft;

rotating means for rotating said shaft; and, a variable speed mechanism for propelling said lawn mowing apparatus, said variable speed mechanism including, A) a variable pitch pulley assembly, said variable pitch pulley assembly operatively connected to said shaft;

B) pulley connecting means for operatively connecting said variable pitch pulley assembly to said transmission, said pulley connecting means providing propulsion for said drive axle;

C) a control arm assembly for controlling said variable pitch pulley assembly, said control arm assembly operatively connected to said variable pitch pulley assembly, said control arm assembly also attached to said body, said control arm assembly including, (1) a control arm having first and second ends and an opening, said first end of said control arm being connected to said body, said shaft rotatably received within said opening in said control arm;

(2) a pivot shaft, said pivot shaft being operatively connected to said [first] *second* end of said control arm, said control arm pivoting about said pivot shaft;

(3) a pivot bracket, said pivot bracket being fixedly connected to said body, said pivot bracket supporting said pivot shaft; and, (4) a torsion spring for biasing said control arm about said pivot shaft, said torsion spring having first and second ends, said second end of said torsion spring being operatively connected to said pivot bracket, said first end of said torsion spring being operatively connected to said control arm, said pivot shaft received within said torsion spring; and, D) selective adjusting means for selectively adjusting said control arm assembly, said second end of said control arm being operatively connected to said selective adjusting means.

[12. A control arm assembly for use with a lawn mowing apparatus having a variable speed mechanism which provides propulsion to the lawn mowing apparatus, the lawn mowing apparatus also having a body, a transmission which is operatively connected to a drive axle, a shaft, and rotating means for rotating the shaft, the variable speed mechanism having a variable pitch pulley assembly, pulley connecting means for operatively connecting the variable pitch pulley assembly to the transmission and, selective adjusting means for selectively adjusting the control arm assembly, the variable pitch pulley assembly having first and second pulley halves, the second pulley half being selectively movable along the length of the shaft, the pulley connecting means fitting between said first and second pulley halves, the control arm assembly for moving the second pulley half along the length of the shaft, the control arm assembly comprising:

a control arm having first and second ends and an opening, said second end of said control arm being pivotably connected to the body, said first end of said control arm being operatively connected to the selective adjusting means, the shaft rotatably received within said opening in said control arm.]

[13. The control arm assembly of claim 12 wherein the control arm assembly further comprises:

a pivot shaft, said pivot shaft being operatively connected to said second end of said control arm, said control arm pivoting about said pivot shaft; and, a pivot bracket, said pivot bracket being fixedly connected to the body, said pivot bracket supporting said pivot shaft.]

[14. The control arm assembly of claim 12 wherein said control arm has a first side for contacting said variable pitch pulley assembly, said first side of said control arm having a contoured surface for even wear of said variable pitch pulley assembly.]

[15. The control arm assembly of claim 14 wherein said control arm has a second side for contacting said variable pitch pulley assembly, said second side having a contoured surface for even wear of said variable pitch pulley assembly.]

[16. A control arm assembly for use with a lawn mowing apparatus having a variable speed mechanism which provides propulsion to the lawn mowing apparatus, the lawn mowing apparatus also having a body, a transmission which is operatively connected to a drive axle, a shaft, and rotating means for rotating the shaft, the variable speed mechanism having a variable pitch pulley assembly, pulley connecting means for operatively connecting the variable pitch pulley assembly to the transmission and, selective adjusting means for selectively adjusting the control arm assembly, the variable pitch pulley assembly having first and second pulley halves, the second pulley half being selectively movable along the length of the shaft, the pulley connecting means fitting between said first and second pulley halves, the control arm assembly for moving the second pulley half along the length of the shaft, the control arm assembly comprising:

a control arm having first and second ends and an opening, said second end of said control arm being connected to the body, said first end of said control arm being operatively connected to the selective adjusting means, the shaft rotatably received within said opening in said control arm;

a pivot shaft, said pivot shaft being operatively connected to said second end of said control arm, said control arm pivoting about said pivot shaft;

a pivot bracket, said pivot bracket being fixedly connected to the body, said pivot bracket supporting said pivot shaft, and, a torsion spring for biasing said control arm about said pivot shaft, said torsion spring having first and second ends, said second end of said torsion spring being operatively connected to said pivot bracket, said first end of said torsion spring being operatively connected to said control arm, said pivot shaft received within said torsion spring.]

17. A method for selectively controlling the ground speed of a lawn mowing apparatus, the lawn mowing apparatus having a body, a transmission which is operatively connected to a drive axle, a shaft, and rotating means for rotating the shaft, the method using a variable speed mechanism, the variable speed mechanism including a variable pitch pulley assembly having first and second pulley halves and a control arm having first and second ends, *the variable speed mechanism also including a pivot shaft operatively connected to the second end of the control arm,* the method comprising the steps of:

positioning a speed selector to a position corresponding to the desired lawn mowing apparatus ground speed;

applying tension to a cable;

moving the first end of a control arm;

*pivoting the control arm about the pivot shaft;* adjusting the position of a second pulley half along the length of the shaft;

changing the effective belt diameter of a variable pitch pulley assembly; and, providing propulsion to the transmission.

[18. The method of claim 17 wherein the variable speed mechanism also includes a pivot shaft operatively connected to the second end of the control arm, the method adding a step after the step of, moving the first end of the control arm, the additional step being:

pivoting the control arm about the pivot shaft.]

*19. The lawn mowing apparatus of claim 9 wherein said cable guide bracket is fixedly connected to said body and has a free rolling roller with a cable channel for use in guiding and receiving said cable.*

*20. The lawn mowing apparatus of claim 1 wherein the apparatus further comprises:*

*a belt connecting said variable pitch pulley assembly to said transmission, said belt being positioned below said body.*

* * * * *